(12) United States Patent
Yokota et al.

(10) Patent No.: US 7,401,118 B1
(45) Date of Patent: Jul. 15, 2008

(54) WEB INFORMATION PREFERENTIAL TRANSFER SYSTEM

(75) Inventors: Daisuke Yokota, Yokohama (JP); Takehiro Morishige, Hachioji (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 801 days.

(21) Appl. No.: 10/276,981

(22) PCT Filed: Jul. 19, 2000

(86) PCT No.: PCT/JP00/04848

§ 371 (c)(1), (2), (4) Date: Nov. 21, 2002

(87) PCT Pub. No.: WO02/07395

PCT Pub. Date: Jan. 24, 2002

(51) Int. Cl.
*G06F 15/16* (2006.01)

(52) U.S. Cl. ............................ 709/203; 709/219

(58) Field of Classification Search ............... 709/201, 709/203, 219
See application file for complete search history.

(56) References Cited

U.S. PATENT DOCUMENTS 6,314,465 B1 * 11/2001 Paul et al. ............... 709/226
6,701,316 B1 * 3/2004 Li et al. .................. 707/10
6,968,379 B2 * 11/2005 Nielsen ................... 709/226

FOREIGN PATENT DOCUMENTS

EP 0971518 * 12/2000

OTHER PUBLICATIONS

S. Blake, D. Black, M. Carlson, E. Davis, Z. Wang, and W. Weiss, "An Architecture for Differentiated Services", Informational Memorandum, Dec. 1998, pp. 1-36.
R. Braden, L. Zhang, S.Berson, S. Herzog, and S. Jamin, "Resource ReSerVation Protocol (RSVP)—Version 1 Functional Specification", Standard Track Memorandum, Sep. 1997, pp. 1-112.

* cited by examiner

*Primary Examiner*—John Follansbee
*Assistant Examiner*—Dhairya A Patel
(74) *Attorney, Agent, or Firm*—Reed Smith LLP; Stanley P. Fisher, Esq.; Juan Carlos A. Marquez, Esq.

(57) ABSTRACT

In a Web information preferential transfer system, two priorities, personal priority and site priority can be set on the site of a user. On the site of a user, the site priority which can be set by a LAN-side proxy server is the priority of when a request is made. A WAN-side proxy server installed on the provider side extracts the site priority of the request, converts it to the final priority according to the communication state and settings, converts the final priority to a preferential control parameter of an IP packet of a Web object in response to the Web request, and relays it to the LAN-side proxy server. Preferential control may be made based on the final priority in the WAN-side proxy server. Charging by the provider is performed based on the communication contents used and the requested priority.

4 Claims, 21 Drawing Sheets

FIG. 5

| URL 620 | TARGET OBJECT TYPE 621 | SPECIFIED RANGE ATTRIBUTE 622 | PERSONAL PRIORITY 623 | ASSURANCE BANDWIDTH 624 |
|---|---|---|---|---|
| http://aaa.ne.jp/myname | ALL | LOW ORDER DIRECTORY | — | — |
| http://www.bbb.co.jp/ | *.exe, *.lzh, .z*ip | IN SITE | LOW PRIORITY | — |
| http://www.ccc.ne.jp/ | ALL | REFERENCE PAGE | PRIORITY | — |
| http://ddd.eee.com/ | *.png | IN SITE | LOW PRIORITY | — |
| http://www.fff.ggg.com/ | ALL | REFERENCE PAGE | PRIORITY | — |
| ALL | ALL | ALL | NORMAL | — |
| URL OWNED BY ACTIVE BROWSER | ALL | ALL | NORMAL | — |

FIG. 6

| USER NAME | USER ID | PASSWORD |
|---|---|---|
| TARO TANAKA | 1000 | **** |
| ICHIRO SATO | 1001 | ****** |
| ⋮ | ⋮ | ⋮ |
| ⋮ | ⋮ | ⋮ |
| ⋮ | ⋮ | ⋮ |
| | | |
| | | |

630 — USER NAME
631 — USER ID
632 — PASSWORD

F I G. 7

| 640 | 641 | 642 | 643 | 644 | 645 | 646 | 647 | 648 |
|---|---|---|---|---|---|---|---|---|
| URL | TARGET OBJECT TYPE | SPECIFIED RANGE ATTRIBUTE | USER ID | PERSONAL PRIORITY | USED VOLUME | TIME | SITE PRIORITY | ASSURANCE BANDWIDTH |
| PREFERENTIAL WEB APPLICATION | ALL | IN THE SAME DOMAIN | 1000 | — | — | | 1 | — |
| — | — | — | — | PRIORITY | BELOW AVERAGE | | 2 | — |
| — | — | — | — | NORMAL | BELOW 20M | | 3 | — |
| — | — | — | — | — | — | | 4 | — |

FIG. 8

| USER ID 650 | TRAFFIC VOLUME (PERSONAL PRIORITY: PRIORITY) 651 | TRAFFIC VOLUME (PERSONAL PRIORITY: NORMAL) 652 | TRAFFIC VOLUME (PERSONAL PRIORITY: LOW PRIORITY) 653 |
|---|---|---|---|
| 1000 | 0M | 10M | 0M |
| 1001 | 2M | 20M | 0M |
| 1002 | 0M | 0M | 50M |
| . | . | . | . |

FIG. 9

| PRIORITY 660 | TRAFFIC VOLUME 661 | MAPPABLE TRAFFIC VOLUME 662 |
|---|---|---|
| 1 | 84 kbps | 100 kbps |
| 2 | 325 kbps | 500 kbps |
| 3 | 700 kbps | — |
| 4 | 405 kbps | — |

FIG. 10

| FLOW NUMBER | SITE PRIORITY | FINAL PRIORITY | TRAFFIC VOLUME | ASSURANCE BANDWIDTH |
|---|---|---|---|---|
| 670 | 671 | 672 | 673 | 674 |
|  |  |  |  |  |
|  |  |  |  |  |
|  |  |  |  |  |

FIG. 11

| FINAL PRIORITY (680) | PERSONAL CONTROL PARAMETER (681) |
|---|---|
| 1 | Precedence:1 |
| 2 | Precedence:2 |
| 3 | Precedence:3 |
| 4 | Precedence:4 |

FIG. 12

| |
|---|
| Resuest-Line |
| geneal-header |
| request-header |
| entity-header |
| PERSONAL PRIORITY — 690 |
| SITE PRIORITY — 691 |
| ASSURANCE BANDWIDTH — 692 |
| CRLF |
| message-body |

HEADER PART   DATA PART

| USED TIME | CLIENT IP ADDRESS | USED URL | USED SIZE | PRI-ORITY | USED BANDWIDTH |
|---|---|---|---|---|---|
| 710 | 711 | 712 | 713 | 714 | 715 |
|  |  |  |  |  |  |
|  |  |  |  |  |  |
|  |  |  |  |  |  |

FIG. 24

| USED TIME ~724 | USED URL ~725 | SIZE ~726 | PRIORITY ~727 | USED BANDWIDTH ~728 |
|---|---|---|---|---|
| | | | | |
| | | | | |
| | | | | |

BILL
USAGE STATEMENT

CHARGE ITEMIZING

| PRIORITY ~729 | USED VOLUME ~730 | USED BANDWIDTH ~731 | SUBTOTAL ~732 |
|---|---|---|---|
| | | | |
| | | | |
| | | | |

| CHARGED AMOUNT | |
|---|---|

WEB INFORMATION PREFERENTIAL TRANSFER SYSTEM

TECHNICAL FIELD

The present invention relates to a Web information preferential transfer system. More specifically, the present invention relates to a Web information preferential transfer system which can set user and site communication priorities when receiving a Web service via a communication network providing the Web service using TCP/IP and can use the existing Internet network as it is.

BACKGROUND ART

In recent years, the number of services and applications using the Web has been higher to increase transmission and reception of Web information. An increase in such Web-related communication traffic makes the network line volume insufficient to slow a service response. Internet communication typically attempts to deliver traffic as equitably as possible irrespective of Web information importance. Both an important traffic and an unimportant traffic are uniformly influenced. Since a response time is secured for a more-important network service, preferential control identifying traffic importance must be done.

There are the following four prior art traffic identification and preferential control methods including the Web.

A first system is that a router identifies the port number of TCP/UDP to deliver it for preferential control. In the system, the router identifies the traffic for preferential control using the port number, the transmitting side IP, and the transmitted side IP included in the header of an IP packet. Typically, a client server type network application uses the specified port number for communication. In the system, the router can identify the type of application, the client, and the server for preferential control.

A second system is that a packet is identified in Precedence field of Type of Service of an IP packet to be preferentially controlled by the router. In the system, the client server type network application adds preferential information to the Type of Service of the packet when a client and a server communicate with each other and the application can specify priority for each data flow.

A third system uses RSVP (Resource Reservation Protocol). In the system, before transmission, a packet needing to secure a communication bandwidth to units configuring a path is transmitted to secure the communication bandwidth of the units on the path for communication. In the system, the application can secure the communication bandwidth for each data flow before transmission so that a response time can be assured for the each data flow.

A fourth system is called packet shaping. The data flow of the client server type network application is identified by the port number, the transmitting side IP and the transmitted side IP on a path between a client and a server. The data flow request interval and network window size are controlled for preferential control for each data flow. In the system, a packet shaper can identify the type of application, the client, and the server for preferential control.

The first and second preferential control systems are described in 2475 of RFC (Request for Comments) in detail. The third system is described in 2205 of the RFC in detail.

The prior art first system identifying a data flow by the port number can identify the data flow only by the type of application.

The Web service typically uses the same port number and cannot identify it for each Web request. Preferential control and bandwidth assurance for each Web cannot be done.

A Web request to a delivery service and a stream service using the Web and a service of a Web business application in which properties such as a traffic volume, a required response time and priority are different are handled to be identical. The traffic of an important Web request is oppressed to slow its response.

The traffic volume of the Web application from the server to the client is larger than that from the client to the server. It is effective to preferentially control the traffic from the server to the client. The Web application uses an unspecified server. It is difficult to realize the preferential control system needing control in the server or on the entire path. For example, in the third system, all units on the path must understand the protocol of the RSVP.

Typically, the communication bandwidth is small on the Internet network where the business network such as LAN accesses the Internet of the provider via a public line. This is a bottleneck in using the Internet. It is effective to perform preferential control of the downward line of the communication path as the bottleneck.

All the prior art first to fourth systems have no idea for preferential control and bandwidth assurance for each Web request. In the provider Internet connection service and the business site connection service, all Web requests of users have the same priority. When a user desires to use a Web service by a quick response and other users fully use the line communication bandwidth, the Web service can be used only by a slow response. A service of the same quality can be only provided at the same charge to a user having a large Web service used amount and a user having a small used amount, which is a kind of inequity.

The present invention has been made to solve the above problems and an object of the present invention is to provide a Web information preferential transfer system in which when the site of a user or a business uses the Internet to receive a Web service, the service can be received with priority according to its quality and charge and the existing Internet network such as a client, a Web server and a path used by the user can be used.

DISCLOSURE OF THE INVENTION

In a Web information preferential transfer system, two priorities, personal priority and site priority can be set on the site of a user. On the site of a user, the site priority which can be set by a LAN-side proxy server is the priority of when a request is made. A WAN-side proxy server installed on the provider side extracts the site priority of the request, converts it to the final priority according to the communication state and settings, converts the final priority to a preferential control parameter of an IP packet of a Web object in response to the Web request, and relays it to the LAN-side proxy server. Preferential control may be made based on the final priority in the WAN-side proxy server.

Charging by the provider is performed based on the communication contents used and the required priority.

BRIEF DESCRIPTION OF DRAWINGS

FIG. 5 is a schematic diagram showing an example of a personal policy managing table 144;

FIG. 6 is a schematic diagram showing an example of a personal information managing table 106;

FIG. 7 is a schematic diagram showing an example of a site policy managing table 114;

FIG. 8 is a schematic diagram showing an example of a use statistical managing table 115;

FIG. 9 is a schematic diagram showing an example of a traffic volume managing table 126;

FIG. 10 is a schematic diagram showing an example of a flow managing table 128;

FIG. 11 is a schematic diagram showing an example of an IP priority map table 125;

FIG. 12 is a schematic diagram showing an example of the structure of an http request header used when adding a priority to a Web request;

FIG. 24 is a schematic diagram showing an example of a bill issued by a provider 102 to a user 104;

BEST MODE FOR CARRYING OUT THE INVENTION

Embodiments according to the present invention will be described below using FIGS. 1 to 28.

Embodiment 1

A first embodiment according to the present invention will be described below using FIGS. 1 to 24.

(I) System Overview

The system overview of a Web information preferential transfer system according to the first embodiment of the present invention will be described using FIG. 1.

Figure 1:
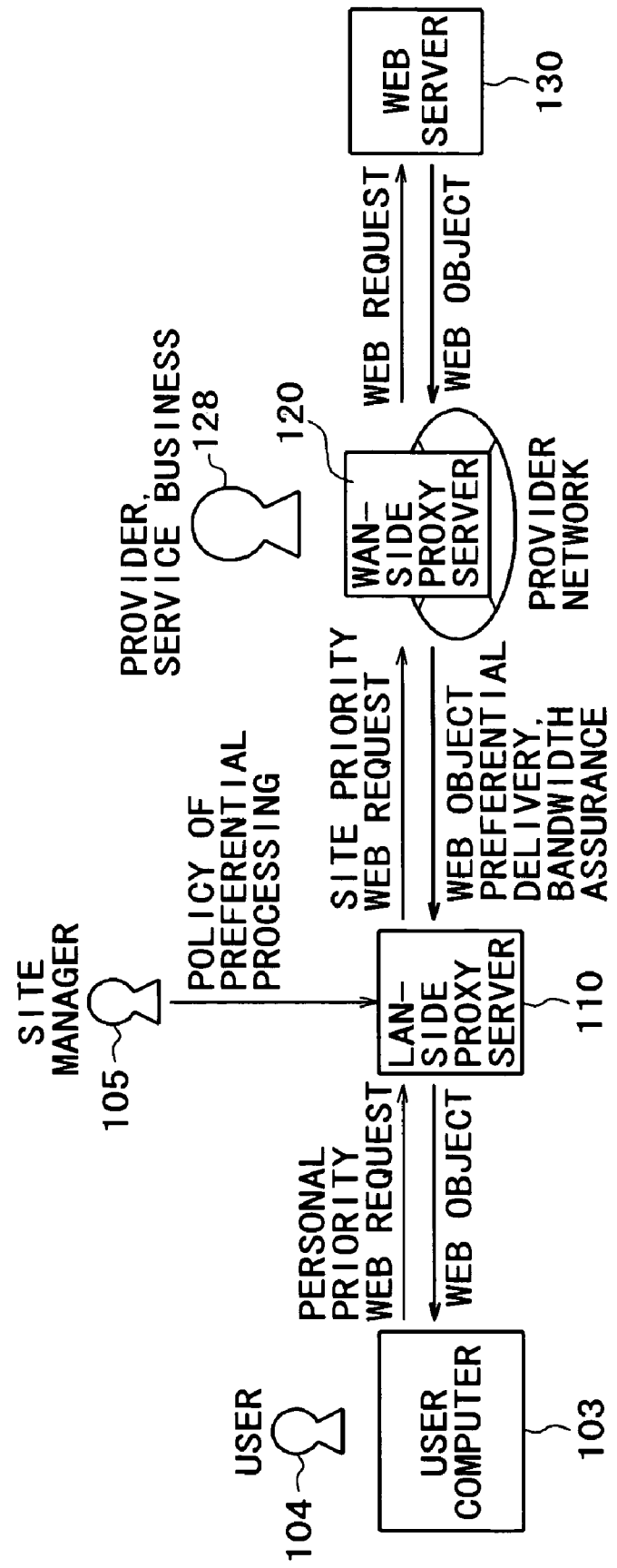
FIG. 1 is a diagram of assistance in explaining a system overview of a Web information preferential transfer system according to a first embodiment of the present invention.

FIG. 1 is a diagram of assistance in explaining a system overview of a Web information preferential transfer system according to the first embodiment of the present invention.

The present invention controls communication when a user accesses a Web server 130. As shown in FIG. 1, when the user makes a request to the Web server 130 to receive a Web object, a traffic from the Web server 130 to the user, the so-called "downward direction" tends to be increased. The main purpose is control of its communication.

When a user 104 uses a browser from a user computer 103 used by the user to see a certain home page, he/she makes a Web request to a LAN-side proxy server 110 of the site to which the user belongs. The LAN-side proxy server 110 makes the Web request to a WAN-side proxy server 120 of a provider network connected to a public network. The WAN-side proxy server 120 transmits the Web request to the Web server 120. For the downward direction, in reverse, the Web server 130 transmits a Web object to the user computer 103 via the WAN-side proxy server 120 and the LAN-side proxy server 110.

The user 104 can set a priority to his/her Web request. A high priority is set to an important and urgent Web request. This is a personal priority.

A site manager 105 of the site to which the user belongs sets a site policy as a policy of communication control on the site in consideration of his/her site management view and the personal priority. A site priority is set based on the site policy to send the site priority when making a Web request to the WAN-side proxy server 120.

When the WAN-side proxy server 120 preferentially transfers a communication packet and assures a communication bandwidth based on the site priority when transferring data sent from the Web server 130.

This is a basic mechanism of this embodiment.

(II) System Configuration

The system configuration of the Web information preferential transfer system according to the first embodiment of the present invention will be described using FIG. 2.

Figure 2:
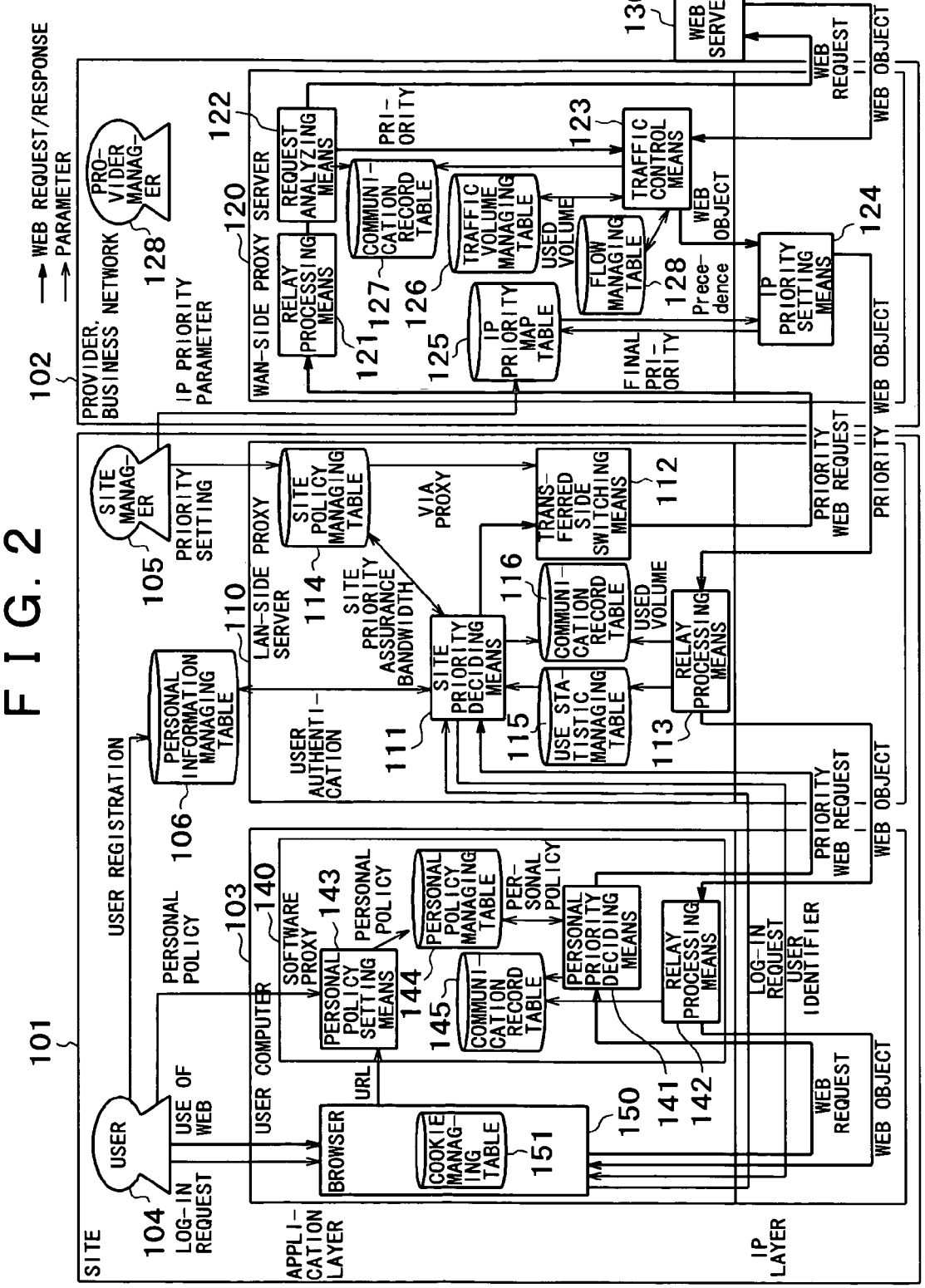
FIG. 2 is a system configuration diagram of the Web information preferential transfer system according to the first embodiment of the present invention.

FIG. 2 is a system configuration diagram of the Web information preferential transfer system according to the first embodiment of the present invention.

This system has the following three units: the WAN-side proxy server 120 in a provider 102 providing an Internet connection service, the LAN-side proxy server 110 in a site 101, and the user computer 103 used by the user 104.

There are the user computer 103 and the LAN-side proxy server 110 in the site 101. The user 104 is a person actually using the Web by the Internet. A site manager 105 is assumed to be a person managing the site 104.

As data, a personal information managing table 106 managing the personal information of the user is arranged.

The user computer 103 is assumed to be a personal computer starting a browser 150 when the user sees Web information. The LAN-side proxy server 110 is a server connected to the user computer 103 by the Local Area Network to be connected to the external Internet network and adds the site priority to a Web request from the user 104.

In the user computer 103, two applications of the browser 150 and a software proxy 140 are executed.

The browser 150 has a cookie managing table 151 storing a cookie sent from the Web server and has a function notifying the URL (Uniform Resource Locater) of the Web application currently displayed on the software proxy 140. The cookie is information in order for the Web server to identify the user. The Web server manages the user using the cookie.

The software proxy 140 is software executed in the user computer 103 and has a function setting a personal priority by a personal policy as the policy of the priority set by the user to relay the Web request to the LAN-side proxy server 110. The software proxy 140 has personal policy setting means 143, a personal policy managing table 144, personal priority deciding means 141, and relay processing means 142. The personal policy setting means 143 provides an interface in order for the user to set a personal policy and reflects its input onto the personal policy managing table 144 for storing. The relay processing means 142 has a function receiving and relaying a Web object sent back from the Web server 130 via the WAN-side proxy server 120 and the LAN-side proxy server 110.

The personal policy is represented as a pair of the URL of a Web page targeted for preferential control and a personal priority thereto and will be described later in detail.

The LAN-side proxy server 110 is a server installed for relaying a Web request from the user computer 103 to the external Internet network and has a function setting and adding a site priority to the Web request. The LAN-side proxy server 110 has a site policy managing table 114, priority deciding means 111, transferred side switching means 112, relay processing means 113, a use statistic managing table 115, and a communication record managing table 116 storing a communication record.

The site policy managing table 114 stores a site policy decided by the site manager 105. The priority deciding means 111 analyzes the Web request of the user to decide a site priority.

The transferred side switching means 112 has a function transmitting a Web request to the WAN-side proxy server 120 when the priority is decided.

The relay processing means 113 is a part receiving the Web object sent from the Web server 130 via the WAN-side proxy server 120 and relaying it to the next user computer 103.

The use statistic managing table 115 stores the communication used rate of the user. The communication record managing table 116 can store and manage the communication record of the user.

On the site in the provider 102, the WAN-side proxy server 120 for relaying the Web request sent from the user to the Web server 130 is installed.

The site priority is added to the Web request sent from the LAN-side proxy server 110. Based on it, the communication of the Web object sent back as a response to the Web request is controlled. A provider manager is placed on the provider network to manage the WAN-side proxy server 120.

The WAN-side proxy server 120 has relay processing means 121, request analyzing means 122, traffic control means 123, a traffic volume managing table 126, IP priority setting means 124, an IP priority map table 125, and a flow managing table 128.

The relay processing means 121 is a part relaying the Web request from the site 101 to the Web server.

The request analyzing means 122 analyzes whether the Web request from the site 101 includes priority information. The traffic control means 123 is operated to control the traffic of the Web object based on the information of the site priority added to the Web request and the current traffic volume. Specifically, the site priority added to the Web request is defined as a final priority (hereinafter called "final priority") based on the current traffic volume.

The traffic volume managing table 126 stores data for managing the current traffic of the Web object.

The site of the provider manages the Web request by a flow concept. Each flow is given by a flow number. The flow managing table 128 stores data for controlling the traffic of each flow.

In the mechanism of preferential control of this embodiment, the priority set on the site 101 to be added to the Web request is reflected onto the parameter of the packet of the Web object sent as a response of the request to control the traffic. The personal priority and the site priority set on the site 101 and the final priority decided by the traffic control means 123 based on it are set in an application layer in a communication model. The priority is reflected onto the parameter of the packet of TCP/IP as the IP layer.

The IP priority setting means 124 is a part reflecting the final priority set to the flow of the Web request by the traffic control means 123 based on the above mechanism onto the parameter of the packet of the corresponding Web object (hereinafter called "preferential control parameter").

The IP priority map table 125 stores data for defining a rule when the IP priority setting means 124 converts the final priority to the preferential control parameter.

(III) Data Structures for Use in the System

Data structures for use in the Web information preferential transfer system according to the first embodiment of the present invention will be described using FIGS. 5 to 14.

FIG. 5 is a schematic diagram showing an example of the personal policy managing table 144.

FIG. 6 is a schematic diagram showing an example of the personal information managing table 106.

FIG. 7 is a schematic diagram showing an example of the site policy managing table 114.

FIG. 8 is a schematic diagram showing an example of the use statistical managing table 115.

FIG. 9 is a schematic diagram showing an example of the traffic volume managing table 126.

FIG. 10 is a schematic diagram showing an example of the flow managing table 128.

FIG. 11 is a schematic diagram showing an example of the IP priority map table 125.

FIG. 12 is a schematic diagram showing an example of the structure of an http request header used when adding a priority to a Web request.

Figures 13, 14:
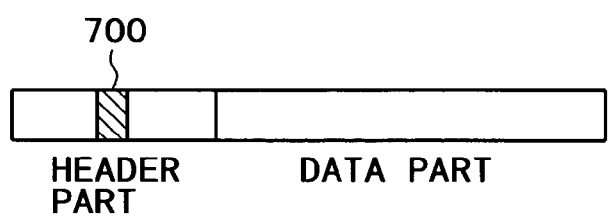
FIG. 13 is a schematic diagram showing an example of an IP packet according to this embodiment; P.4
FIG. 14 is a schematic diagram showing an example of a communication record table 116.

FIG. 13 is a schematic diagram showing an example of an IP packet according to this embodiment.

FIG. 14 is a schematic diagram showing an example of the communication record table 116.

The personal policy managing table 144 shown in FIG. 5 is a table representing the personal policy as a pair of a target Web request condition and a personal priority result thereto.

As the target Web request conditions, it has items of a requested side URL 620, a target object 621, a specified range attribute 622, and a time 623. As the personal priority results, it has items of a personal priority 624 and an assurance bandwidth 625. The record means that the personal priority results of the Web request satisfying all the requested side URL 620, the target object 621, the specified range attribute 622 and the time 623 are the personal priority 624 and the assurance bandwidth 625 of the record.

The requested side URL is a field specifying the URL of a target request. In this column, the URL can be described directly and a keyword such as "all" and "active browser" can be specified. When describing "all", all the URLs are targeted. When describing "active browser", the URL of the browser whose window is active is targeted. The target object type 621 is a field specifying the object type targeted for the Web request. For example, as shown in the drawing, a file type extension or a keyword such as "all" is specified. The specified range attribute 622 is a field setting the specified URL range in more detail. The keywords as shown in the drawing can be specified.

The personal priority 623 can specify three types of "priority", "normal", "low priority" in the order of decreasing priorities in the example of the drawing. The personal priority result can be in the field of the assurance bandwidth 624 and by describing the assurance bandwidth according to its communication.

The personal information managing table 106 shown in FIG. 6 is a table recording data in order for the system to authenticate and manage the person and has items of a user name 630, a user ID 631, and a password 632. The user name 630 is a normal personal name. The user ID 631 is a unique key in order for the system to identify the person. The password 632 is used for authenticating the person.

The site policy managing table 114 shown in FIG. 7 is a table describing a rule setting the site policy on the site 101 and is represented as a pair of a target Web request condition and a site priority result thereto.

The target Web request conditions are items of a requested side URL 640, a target object type 641, a specified range attribute 642, a user ID 643, a personal priority 644, a used volume 645, and a time 646. The site priority results are items of a site priority 647 and an assurance bandwidth 648. The site policy managing table 114 means that the site priority results are set to the Web request satisfying all the target Web request conditions. It should be noted that the personal priority 644 is included in the conditions and the personal priority is reflected onto the site priority.

The meanings of the requested side URL 640, the target object type 641 and the specified range attribute 642 are the same as those in the personal policy managing table of FIG. 5. The user ID 643 is a user ID targeted by the policy and is defined in the field of the user ID 631 of the personal information managing table 106 of FIG. 6. The personal priority 644 is a priority defined by the field of the personal priority 623 of the personal policy managing table 144. The used volume 645 is a traffic volume representing how many lines are used. The time 646 represents a communication time applying the site policy.

The site priority 647 is the site priority set when satisfying the above target Web request conditions and has four stages in the example of FIG. 7. The smaller the value, the higher the priority. The assurance bandwidth 648 is a bandwidth amount assured as the site when satisfying the Web request conditions.

The use statistic managing table 115 shown in FIG. 8 is a table showing the previous Web service used volume of the user. The stored traffic volume of communication on the site is shown for each of the users. The use statistic managing table 115 has a user ID 650 and other traffic volumes 651, 652 and 653 of the personal priority.

The traffic managing table 126 shown in FIG. 9 is a table used when performing traffic control in the WAN-side proxy server 120 and shows the current traffic volume and an allocatable upper limit value for each priority. A priority 660 is a final priority for use in traffic control in the WAN-side proxy server 120. A traffic volume 661 is a current traffic volume of communication by its priority. A mappable traffic volume 662 is the upper limit value of the traffic volume which can be allocated by its priority.

The flow managing table 128 shown in FIG. 10 is a table managing, as a flow, the Web request and the Web object sent as its response in the WAN-side proxy server 120. Communication about the Web request and the Web object sent as its response is given a flow number to be managed in the WAN-side proxy server 120.

The flow managing table 128 has items of a flow number 670, a site priority 671, a final priority 672, a traffic volume 673, and an assurance bandwidth 674. The flow number 670 is a number uniquely given to the data flow of the Web request and the Web object sent as its response. The site priority 671 is a site priority added to the Web request in the LAN-side proxy server 110. The final priority 672 is a final priority finally decided with reference to the site priority and other communication states in the WAN-side proxy server 120. The assurance bandwidth 674 is an assurance bandwidth requested by the Web request.

The IP priority map table 125 shown in FIG. 11 is a table showing a corresponding rule of the final priority and the preferential control parameter in the IP layer. A final priority 680 is a final priority of a flow decided in the WAN-side proxy server 120. A Precedence value showing the priority of the IP packet is included in a preferential control parameter 681.

The http request header shown in FIG. 12 shows the structure of the http request header used when adding the priority to the Web request.

To transmit the priority between the units, the standard of http Ver1.1 defined by the RFC is defined. In comparison with it, as header extension items, items of a personal priority 690, a site priority 691, and an assurance bandwidth 692 are added. The personal priority set by the personal policy and the site priority set by the site priority are written into this area.

The example of the preferential control parameter used in the IP layer is added to the header part of the IP packet according to this embodiment shown in FIG. 13. Specifically, to preferentially control each packet in the IP layer, the priority information is added to a Precedence field 700 of Type of service in the IP header.

The communication record table 116 shown in FIG. 14 is a table storing recorded data of communication in the WAN-side proxy server 120. The communication record table 116 has items a used time 710, a client IP address 711, a used URL 712, a used size 713, a priority 714, and a used bandwidth 715. They are recorded for each communication and are used when charging by the provider is performed to the user.

(IV) Detail of the Communication Operation of the System

The detail of the communication operation of the Web information preferential transfer system according to the first embodiment of the present invention will be described using FIGS. 2, 3, 4, and 15 to 23.

Figure 3:
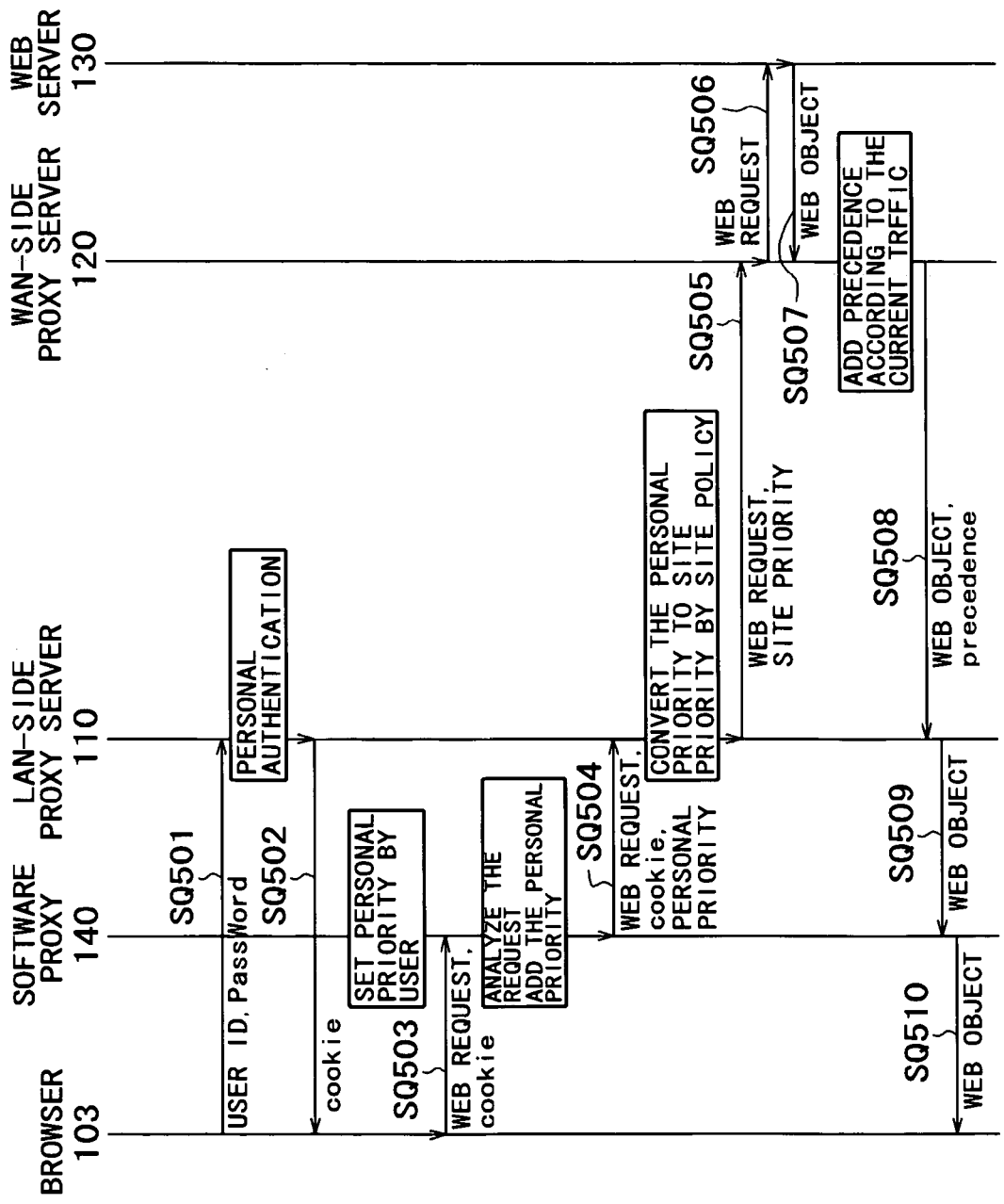
FIG. 3 is a communication sequence diagram of the Web information preferential transfer system according to the first embodiment of the present invention.

FIG. 3 is a communication sequence diagram of the Web information preferential transfer system according to the first embodiment of the present invention.

Figure 4:
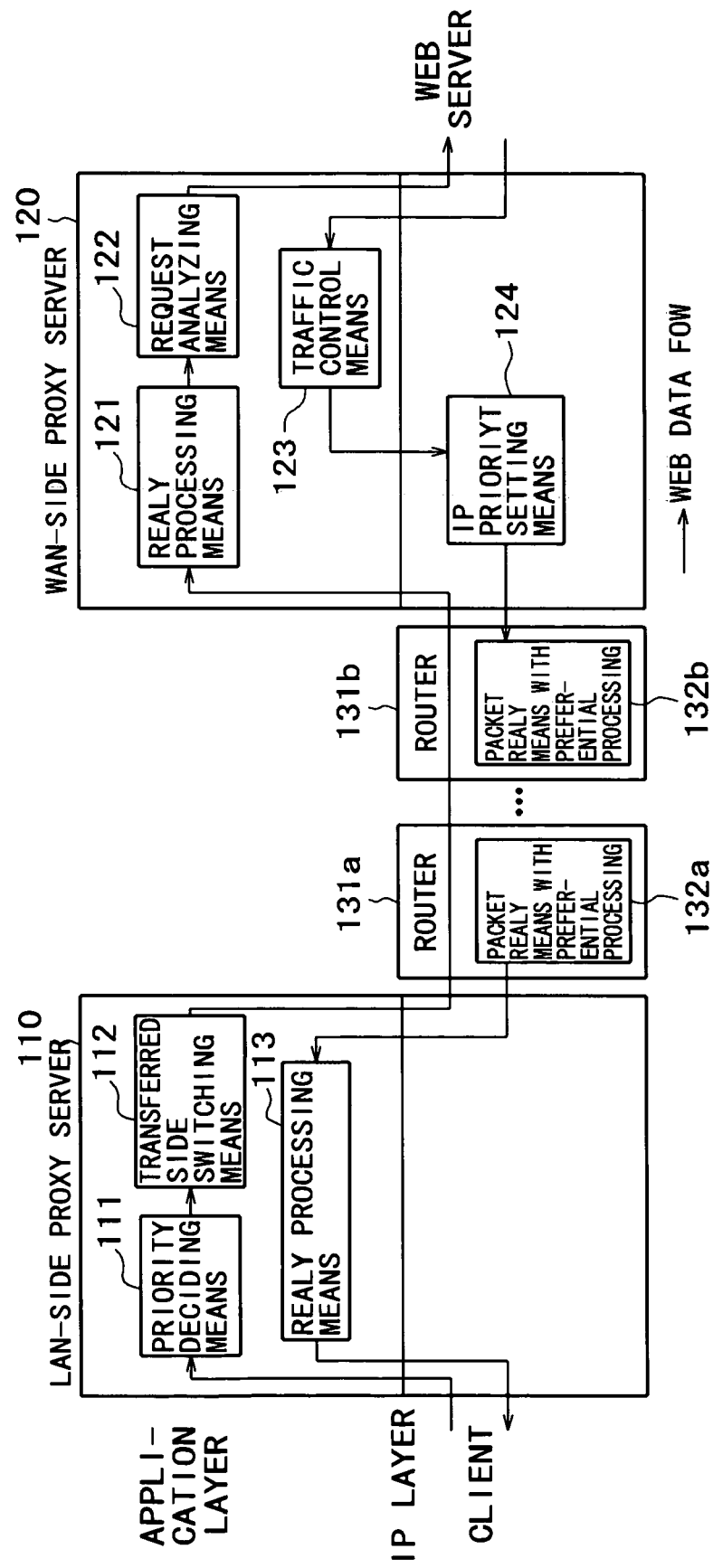
FIG. 4 is a diagram showing an overview of the communication flow of the Web information preferential transfer system according to the first embodiment of the present invention.

FIG. 4 is a diagram of an overview of the communication flow of the Web information preferential transfer system according to the first embodiment of the present invention. P.11

Figure 15:
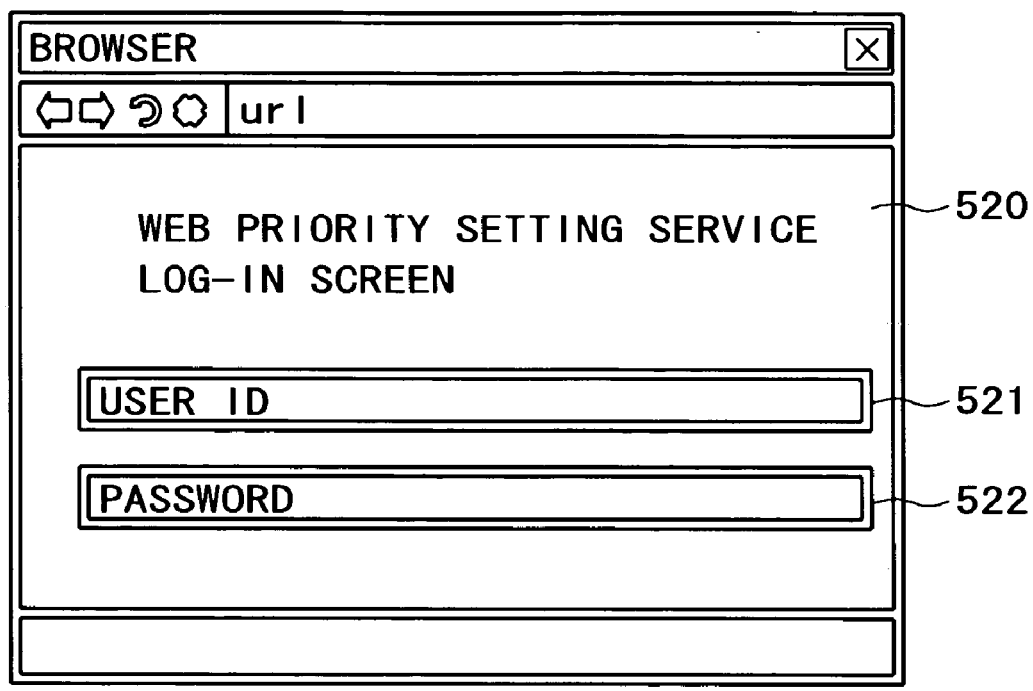
FIG. 15 is a schematic diagram showing a log-in screen.

FIG. 15 is a schematic diagram showing a log-in screen.

Figure 16:
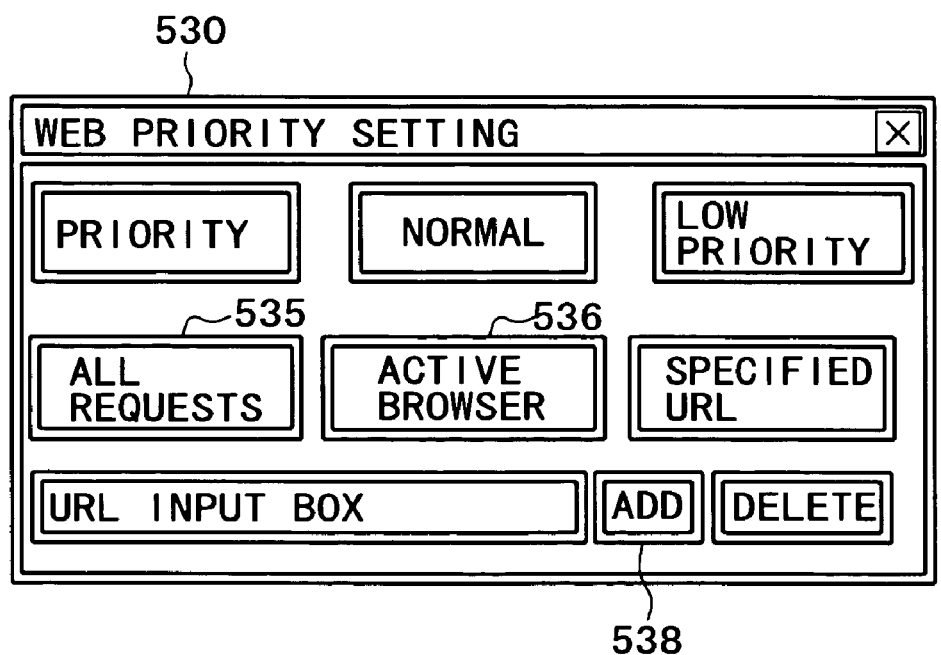
FIG. 16 is a schematic diagram showing a personal policy setting screen.

FIG. 16 is a schematic diagram showing a personal policy setting screen.

Figure 17:
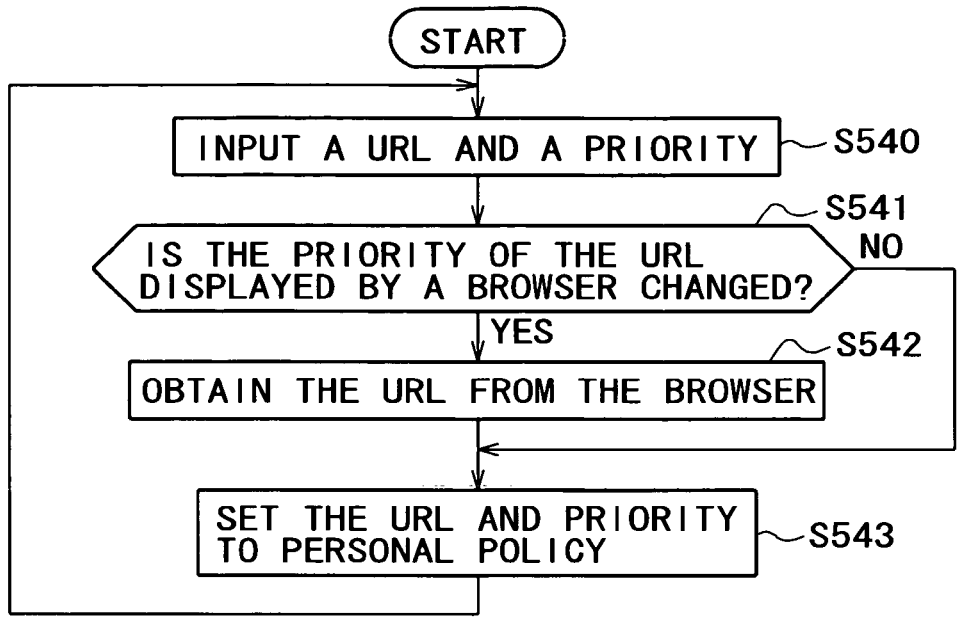
FIG. 17 is a flowchart showing a personal policy setting procedure.

FIG. 17 is a flowchart showing a personal policy setting procedure.

Figure 18:
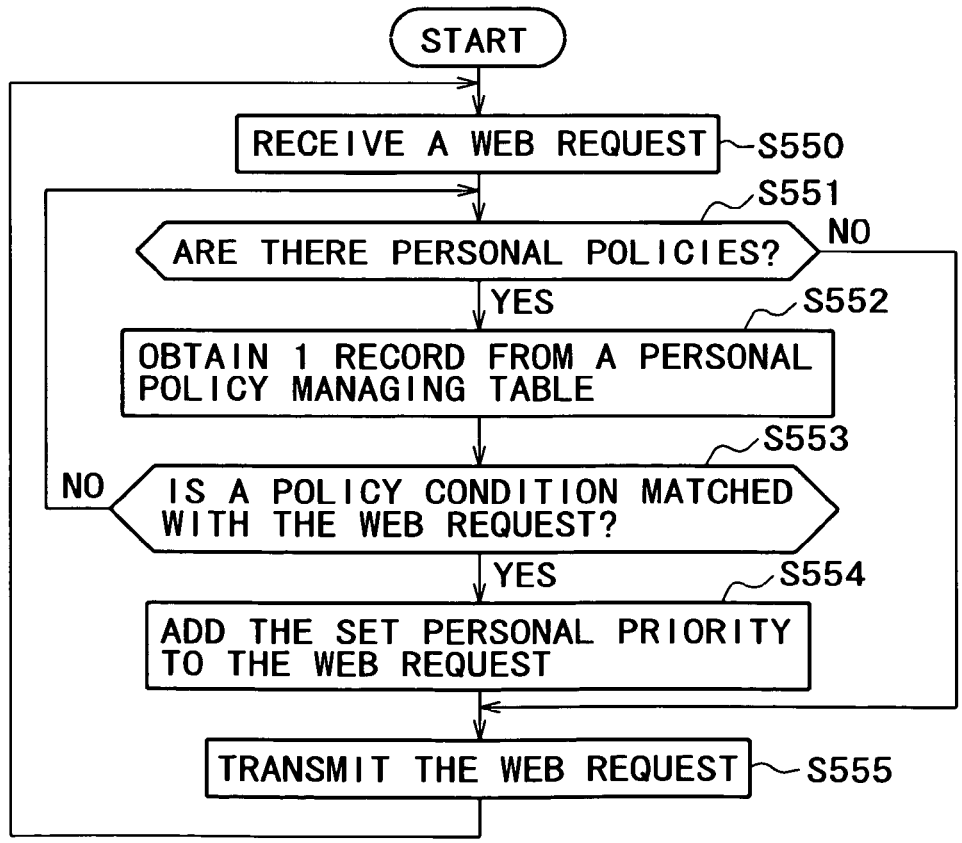
FIG. 18 a flowchart showing a procedure when a software proxy 140 receives a Web request.

FIG. 18 a flowchart showing a procedure when the software proxy 140 receives a Web request.

Figure 19:
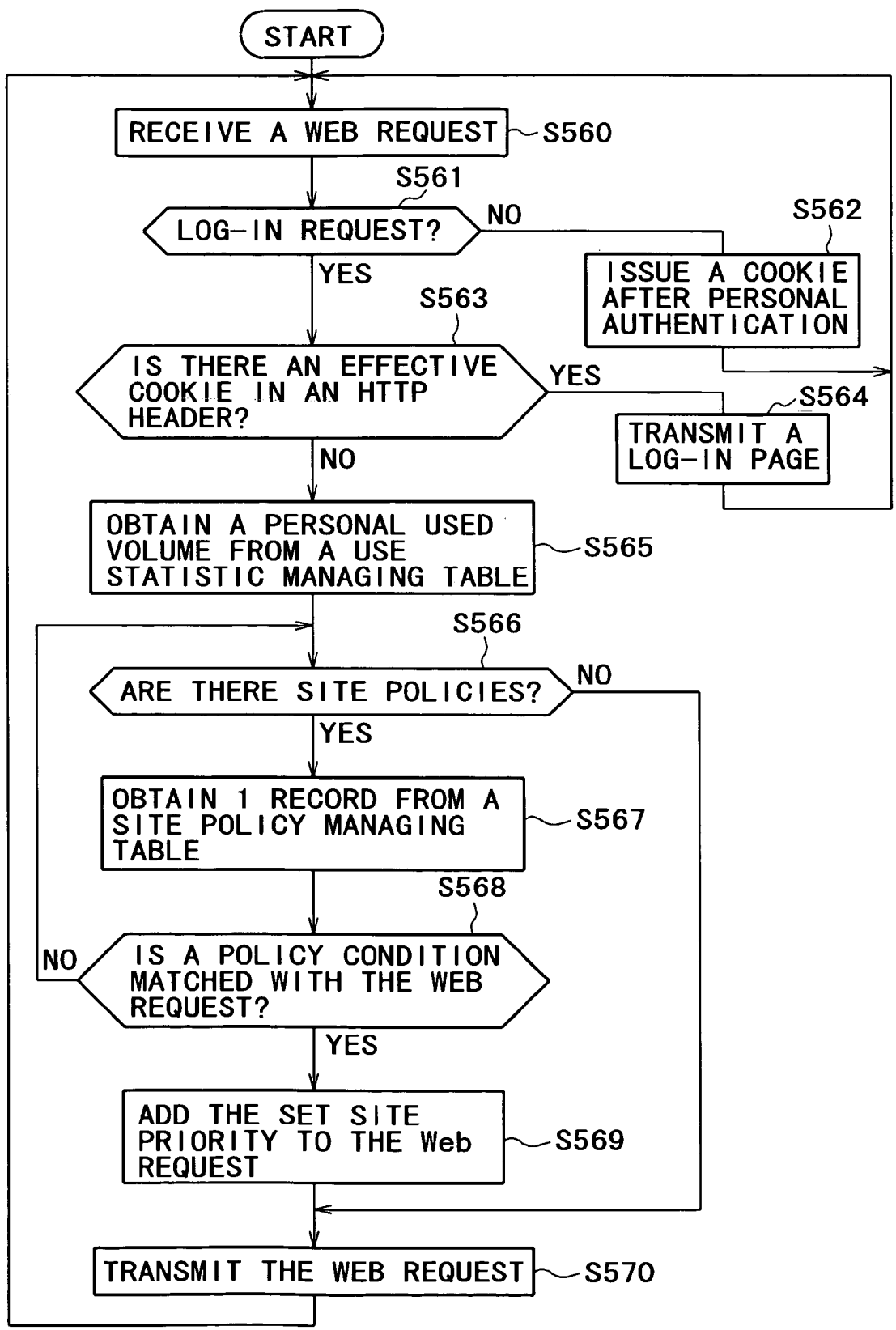
FIG. 19 a flowchart showing a procedure when a LAN-side proxy server 110 receives a Web request.

FIG. 19 a flowchart showing a procedure when the LAN-side proxy server 110 receives a Web request.

Figure 20:
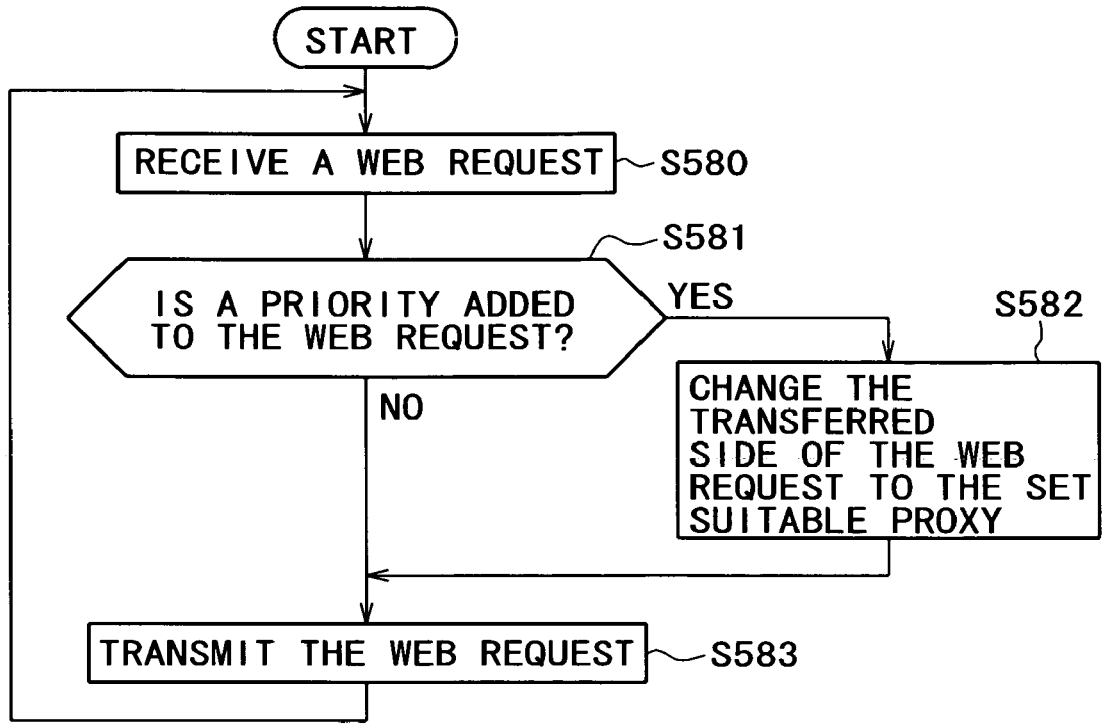
FIG. 20 is a flowchart showing a procedure deciding a transferred side of a Web request.

FIG. 20 is a flowchart showing a procedure deciding a transferred side of a Web request.

Figure 21:
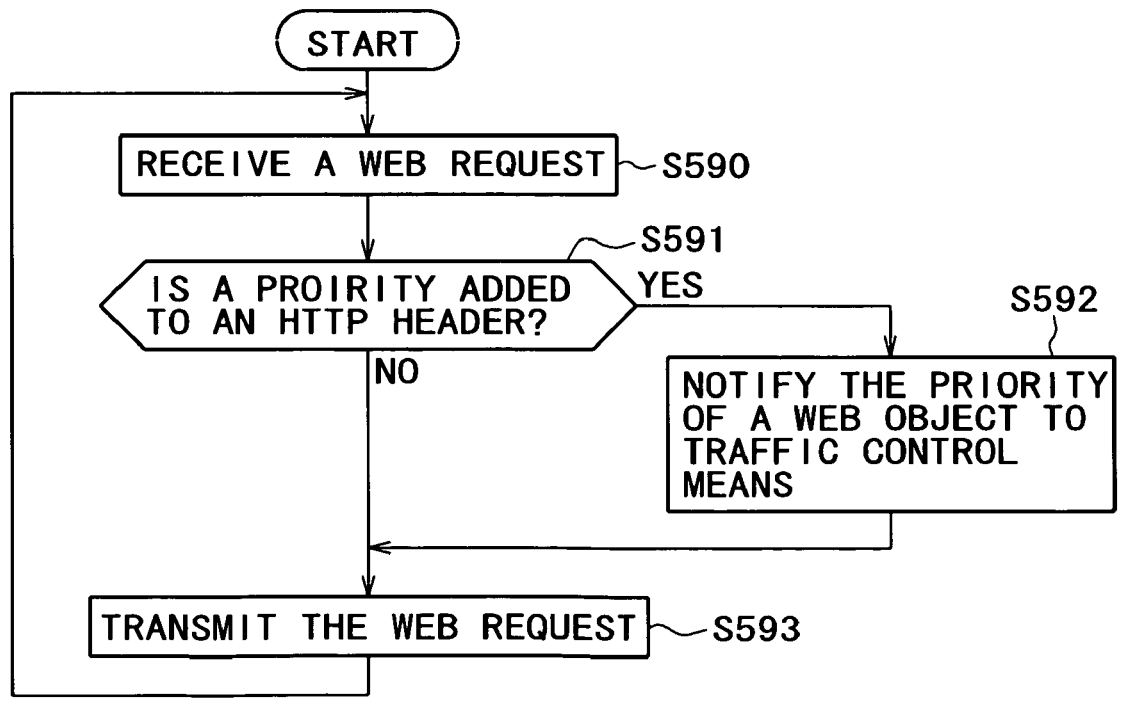
FIG. 21 a flowchart showing a procedure when a WAN-side proxy server 120 receives a Web request.

FIG. 21 a flowchart showing a procedure when the WAN-side proxy server 120 receives a Web request.

Figure 22:
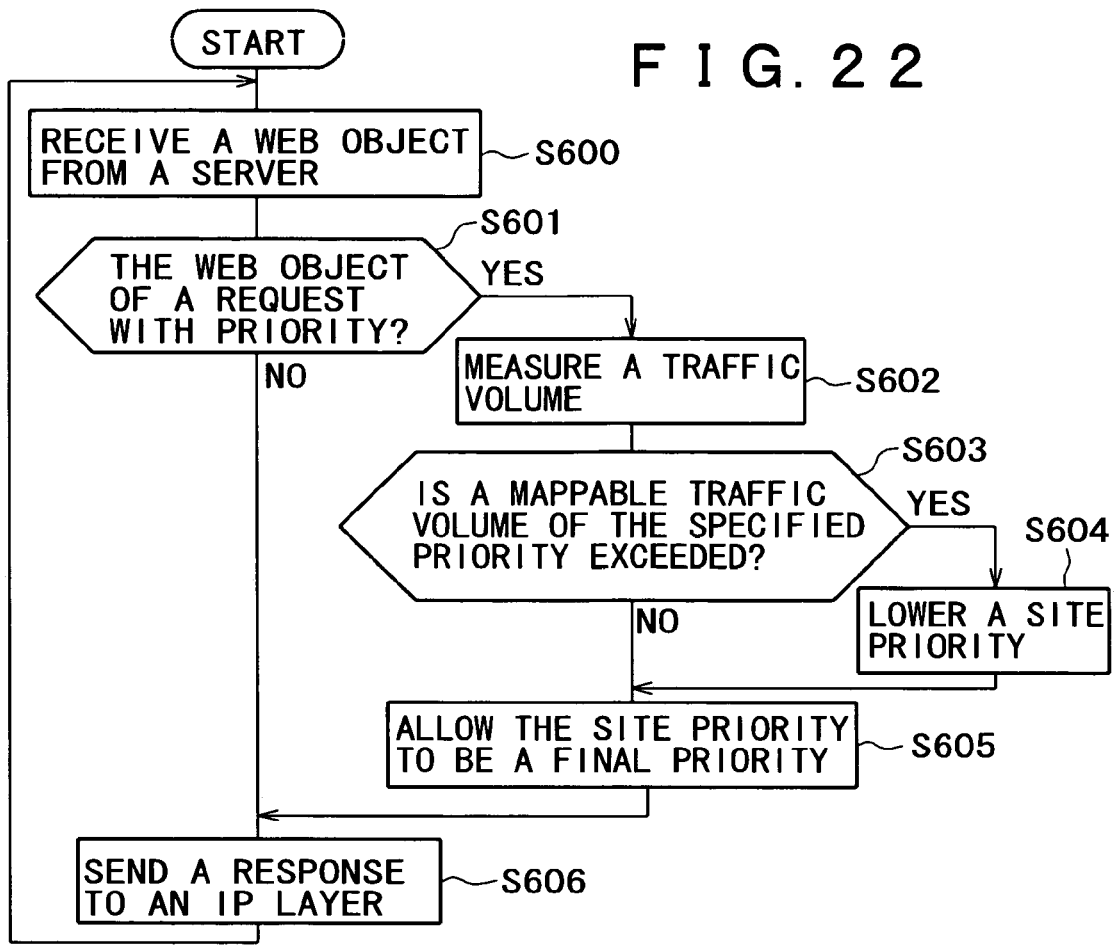
FIG. 22 is a flowchart showing a procedure for traffic control.

FIG. 22 is a flowchart showing a procedure for traffic control.

Figure 23:
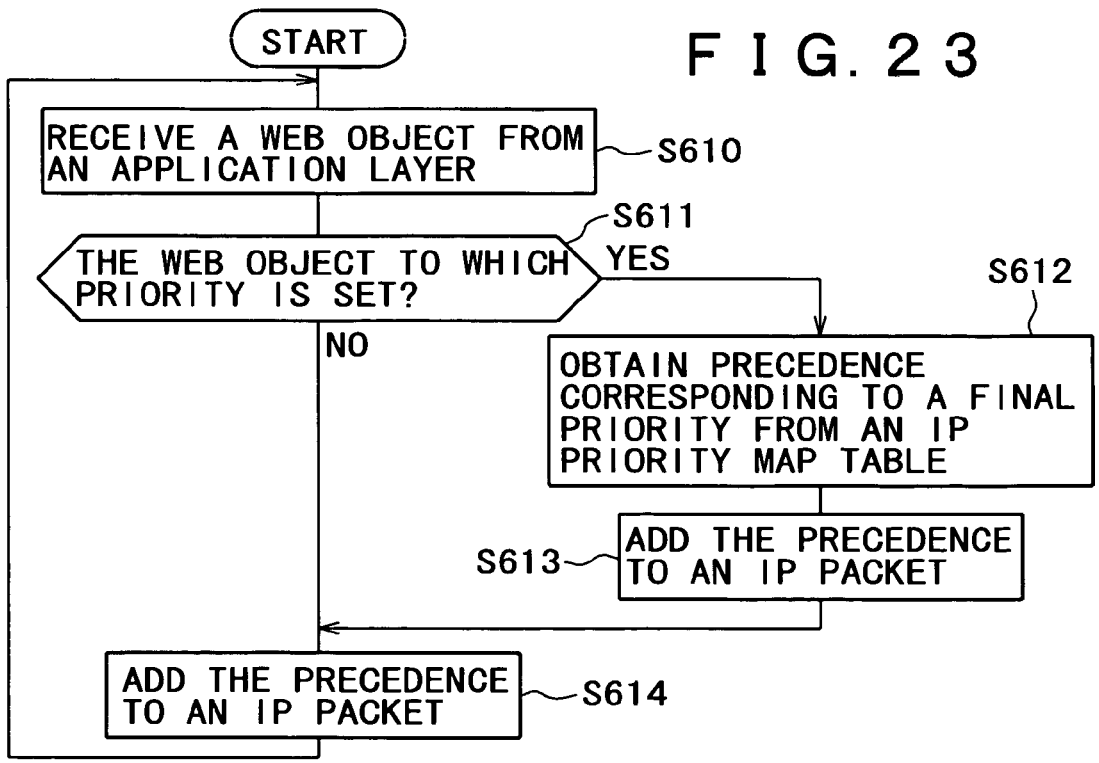
FIG. 23 is a flowchart showing a procedure for setting a preferential control parameter.

FIG. 23 is a flowchart showing a procedure for setting a preferential control parameter.

The summary of the communication flow of the Web information preferential transfer system of the present invention is as shown in FIG. 4. With the drawing, it is easily understood when seeing the flow of the processes.

(IV-1) User Registration

When the user 104 desires to use a Web service with preferential control, the user ID and the password are registered as the user information into the personal information managing table 106 in the site 101. They are registered into the personal information managing table 106, as shown in FIG. 6.

(IV-2) Personal Policy Setting and Registration

The user 104 registers the URL and the priority of the Web service which is desired to be used preferentially as the personal policy into the software proxy 140 using a personal policy setting screen 530 of FIG. 6.

As shown in FIG. 6, the personal policy setting screen 530 has a priority button 531, a normal button 532, and a low priority button 533 specifying the personal priority. An all requests button 535, a most front browser button 536, a specified URL button 537, a URL input box 534 for specifying a URL, a URL add button 538, and a URL delete button 539 can specify the target Web request.

To specify the priority, a target Web request is specified to click the desired priority button.

The Web request can be actually specified by the following three methods.

In a first method, the all requests button 535 is selected to set the priorities of all the following Web requests.

In a second method, the active browser button 536 is selected to specify the Web service displayed by the browser whose window is active.

The multi-window OS may start a plurality of browsers. The priority is set to the URL displayed by the most front browser whose window is active.

In a third method, the specified URL button 537 is selected to set the priority to the specified URL. The URL to be preferential can be registered by inputting the URL into the URL input box 534 and pressing the URL add button 538. When deleting the registration of the URL, the URL is inputted into the URL input box 534 to press the URL delete button 539.

The URL of the target Web service is specified by the above method to specify the personal priority. The personal priority can be set to priority, normal and low priority by the priority button 531, the normal button 532, and the low priority button 533. The personal priority is higher in order of priority, normal and low priority. When the priority is high, the response is assured not to be slowed as compared with the traffic of the low-priority Web request.

When the above input operation is done, the personal policy setting means 143 of the software proxy 140 is registered into the personal policy managing table 144 based on the flowchart of FIG. 17.

The URL and the priority are inputted from the user by the above method (S540).

Whether the priority of the URL displayed by the browser is changed or not is judged (S541). When necessary, the specifying method acquires the URL of the page displayed by the browser (S542) so that the inputted personal policy is registered into the personal policy managing table. It is stored into the personal policy managing table 144 in the format as shown in FIG. 5.

(IV-3) Log-In

When the user 104 uses the Web service, he/she must receive user authentication by log-in.

When the user actually requests the Web service, the Web request to the Web server 130 is sent to the LAN-side proxy server 110 via the personal policy deciding means 141. When the cookie authenticating the user is not added to the Web request, the LAN-side proxy server 110 sends back the log-in screen to the user 104 to request a log-in process.

The log-in screen for use in user authentication is the screen as shown in FIG. 6 and is provided as the Web page to the user 104. The user 104 can access it by the browser 150. A log-in screen 520 has a user ID input box 521 and a password input box 522. The user 104 inputs his/her user ID and password thereto. The browser 150 transmits the inputted user ID and password as the log-in request to the LAN-side proxy server 110 (SQ 501 of FIG. 3).

The user 104 who has completed the above log-in process can use the Web service with the personal priority.

(IV-4) Reception of the Web Request of the Software Proxy 140

The procedure for receiving the Web request of the software proxy 140 will be described while following the flowchart of FIG. 18.

The Web request from the browser 150 is sent to the software proxy 140 (SQ503 of FIG. 3).

The Web request from the browser 150 is received (S550). Whether there are personal policies to be read or not is judged (S551).

When there are personal policies, one of them is read from the personal policy managing table 144 shown in FIG. 5 (S552). Whether the record of the read personal policy and the received Web request condition are matched or not is judged (S553). The process is repeated until there are no personal policies to be read.

Specifically, whether the URL 620 of the personal policy managing table 144 is matched with the URL of the Web request is judged. When the specified range attribute 622 is a low order directory, the directory below the URL 620 is also matched. When "in site" is described, the same site is also matched. The Web object type of the Web request and the target object type 621 are compared.

With judgment in this manner, when the received Web request condition is matched with the personal policy, the personal priority 623 registered into the personal policy is added to the Web request (S554). Specifically, the value of the personal priority 623 of the personal policy managing table 144 is written into the item of the personal priority 690 of the http request header shown in FIG. 12. Finally, the Web request is transmitted (S555).

In this embodiment, the personal policy is represented as one record of the personal policy managing table 144, but may be represented by other methods.

(IV-5) Reception of the Web Request of the Lan-Side Proxy Server 110

The process for receiving the Web request of the LAN-side proxy server 110 will be described while following the flowchart of FIG. 9.

The Web request is transmitted from the software proxy 140 to the LAN-side proxy server 110 (SQ505 of FIG. 3).

The LAN-side proxy server 110 receives the Web request (S560) to judge whether it is a log-in request (S561).

In the case that it is the log-in request, the personal information managing table 106 is used to compare the user ID and the password transmitted from SQ501 of FIG. 3 to judge whether they are effective or not.

When they are effective, a cookie issuing phase 562 issues a cookie (S562, SQ502 of FIG. 3).

In the case that it is not the log-in request, whether the http header of the Web request includes the effective cookie is judged (S563).

When not including a cookie, the log-in screen is transmitted to the user (S564) to prompt log-in to the user 104. After issuing a cookie, when there is no request for a fixed time, use is judged to be completed to discard the cookie. For personal authentication, the user ID, the password and the cookie are used together. Other methods, for example, a method for using a specified encryption algorithm and a method with fingerprints may be used.

When the http header of the Web request includes an effective cookie and personal authentication can be done, after checking the personal authentication, the used volume of the authenticated user 104 is obtained from the use statistic managing table 115 shown in FIG. 8 (S565).

Whether there are site policies to be read or not is judged (S566). When there are site policies, one of them is read from the site policy managing table 114 shown in FIG. 7 (S567).

Whether the received Web request condition is matched with the read site policy or not is judged (S568). The process is repeated until all the site policies are lost.

Specifically, the URL and the Web object type of the Web request are compared by the same method as S553 of FIG. 18. The user and the personal priority of the Web request are compared with the user ID 643 and the personal priority 644. Whether the used volume of the user is matched with the condition recorded into the used volume 645 is judged. For example, when the used volume of a certain user exceeds the average of the entire used volume, the policy can be set to lower the site priority.

In this embodiment, the site policy is represented as one record of the site policy managing table 114, but may be represented by other methods.

When the received Web request condition is matched with the site policy, the site priority 647 registered into the site policy managing table 114 is added to the Web request (S647). Specifically, the value of the site priority 647 of the site policy managing table 114 is written into the item of the site priority 691 of the http request header shown in FIG. 12.

After deciding the transferred side in the next (IV-6) phase, the Web request is transmitted to the external Internet network (S570, SQ505 of FIG. 3).

(IV-6) Decision of the Transferred Side of the Web Request

The procedure for deciding the transferred side of the Web request by the LAN-side proxy server 110 will be described while following the flowchart of FIG. 20.

The Web request in which the site priority is decided is sent to the transferred side switching means 112 of the LAN-side proxy server 110 (S580).

The Web request received here is judged to have the site priority or not (S581). When the site priority is added, it is transmitted to the set suitable WAN-side proxy server 120 (S582). For example, when a plurality of WAN-side proxy servers are prepared, the suitable WAN-side proxy server is selected from the URL requested by the Web request.

When the site priority is not added, it is not sent to the WAN-side proxy server 120 so as not to perform preferential control of the present invention.

(IV-7) Reception of the Web Request of the Wan-Side Proxy Server 120

The Web request to which the site priority is added, as described above, is transmitted to the WAN-side proxy server 120.

The procedure for receiving the Web request of the WAN-side proxy server 120 will be described while following the flowchart of FIG. 21.

The Web request transmitted to the WAN-side proxy server 120 is transmitted to the request analyzing means 122 via the relay processing means 121.

The Web request is received by the request analyzing means 122 (S590). Whether the site priority is defined to the http header in the Web request or not is judged (S591). When it is added, it is notified to the traffic control means 123 (S592).

The Web request is transmitted to the requested side Web server 130 requested by the Web request (S593, SQ506 of FIG. 3).

(IV-8) Traffic Control of the Wan-Side Proxy Server 120

The WAN-side proxy server 120 transmits the Web request to the Web server 130. The Web object is received as its response by the traffic control means 123 of the WAN-side proxy server 120 (SQ507 of FIG. 3).

The procedure of traffic control to the Web object in the WAN-side proxy server 120 will be described below while following the flowchart of FIG. 22.

The traffic control means 123 receives the Web object from the Web server 130 (S600).

The traffic volume of the received packet is measured to record the current traffic volume passing through the WAN-side proxy server into the traffic volume 661 of the traffic volume managing table 126 shown in FIG. 9 for each priority.

Likewise, to the communication record table 127 shown in FIG. 14, the time receiving the Web request, the requested URL, the Web object size, the priority, and the bandwidth used for reception are recorded into the a used time 683, a used URL 684, a size 685, a priority 686 and a used bandwidth 687.

When there is a priority in the (IV-7) phase, the request analyzing means 122 notifies it. Whether the priority is notified or not is judged (S602).

In the case of the traffic to be preferential, the traffic volume by priority passing through the WAN-side proxy server 120 and the allocatable traffic volume are obtained from the traffic volume managing table 126. Whether the traffic volume of the received Web object exceeds the allocatable traffic volume is judged (S603). When it exceeds, the priority is lowered by one (S604) to be the final priority (S605).

When the traffic volume does not exceed the allocatable traffic volume, the specified site priority is the final priority (S605).

The final priority is added to the Web object to be sent to the IP priority setting means 124 (S606). The traffic control means 123 manages the traffic by the flow managing table 128 shown in FIG. 10.

(IV-9) Setting of the Preferential Control Parameter

In the previous (IV-8) phase, the final priority is decided. The final priority is decided in the application layer by the traffic control means. This is changed to the preferential control parameter recognized by the IP layer for preferential control at the packet level, which is the idea of the present invention.

The procedure will be described by following the flowchart of FIG. 23.

The IP priority setting means 124 receives the Web object from the traffic control means 123 (S610).

Whether the final priority is added to the Web object is judged (S611). When the final priority is added, a Precedence value as the preferential control parameter in the IP layer corresponding to the final priority from the IP priority map table 125 shown in FIG. 11 is obtained (S612). The Precedence value converted from the final priority is added to the Precedence field 700 of Type of service of the IP packet transmitted shown in FIG. 13 (S613) to transmit the IP packet to the Internet network (S614).

(IV-10) The Packet Flow Thereafter

As shown in FIG. 4, the IP packet to which the preferential control parameter is set is sent to the routers to be relayed to the Internet network. The Internet network of the WAN-side proxy server 120 and the LAN-side proxy server 110 is connected to routers 131b and 131a. The routers have a function preferentially controlling the IP packet by the preferential control parameter.

The Web object transmitted from the WAN-side proxy server 120 is received by the relay processing means 113 of the LAN-side proxy server 110. The relay processing means 113 records the traffic volume of the received Web object into the use statistic managing table 115 and the communication record table 116 to be transmitted to the user computer 103 (508 of FIG. 3).

The Web object transmitted from the LAN-side proxy server 110 is sent to the relay processing means 142 of the software proxy 140 of the user computer 103 (509 of FIG. 3). The relay processing means 142 records the traffic request time, the IP address of the user computer, the request URL, the Web object size, the personal priority, and the used bandwidth into the communication record table 116. The relay processing means 142 transmits them to the browser 150 (509 of FIG. 3), which is finally provided to the user 104.

(V) Other Communication Control Methods

In the above examples, the Precedence of Type of service of the IP packet is used and the routers which can understand the preferential control parameter perform preferential control of the packet.

Other than the preferential control, other preferential control methods may be used. There can be considered a method in which the WAN-side proxy server 120 can deliver a packet while performing preferential control. For example, the WAN-side proxy server 120 buffers and delivers the packet for each priority.

(VI) Features of the System of the Present Invention

As described above, in the present invention, the communication priority set by the application is converted to each of the Precedence values of the packet of the IP layer. The present invention has the mappable traffic volume for each priority, as shown in FIG. 9. When the priority is converted to each of the Precedence values, the traffic volume of the packet for each of the Precedence values of the IP layer is defined. The priority is controlled so as not to exceed the traffic volume. In the relay unit in the IP layer such as the router, it can be expected that the high-priority packet queue is not overflowed and the packet communication in the IP layer can be operated without any trouble.

The present invention can be realized in such a manner that highest Precedence is allocated only for bandwidth assurance to the Web request of the bandwidth assurance request to set the mappable traffic volume, thereby receiving the Web request with a bandwidth assurance request only by the traffic volume by the site policy. At this time, when the Web request with a bandwidth assurance request exceeding the mappable traffic volume exists, the final priority is lowered.

The user may perform communication other than the Web request, which is not described in this embodiment. In the traffic control of applications (e.g., FTP and mail) other than http, the preferential control function of the relay units used is used, for example, a TCP port is used to set a bandwidth for each of the applications.

In the first embodiment, according to the preferential control policy of the user and the site manager, the used volume of each user and information of the application layer of a Web page used are used to perform preferential control and bandwidth assurance in the IP layer for each packet.

Using the WAN-side proxy server 120, to the Web object from the Web server 130 not corresponding to preferential control and bandwidth assurance, the WAN-side proxy server 120 performs traffic control by the policy requested from the user for preferential control and bandwidth assurance to the Web object.

To execute the present invention, the WAN-side proxy server 120 has a mechanism checking the priority to convert it to the preferential control parameter. The Web server 130 providing the Web object is the same as the above Web server without changing its communication interface at all so as to provide the Web service.

(VII) Services Expected by this System

Services expected by the Web information preferential transfer system according to the first embodiment of the present invention will be described using FIG. 24.

FIG. 24 is a schematic diagram showing an example of a bill issued by the provider 102 to the user 104.

A bill 720 has columns of a usage statement table 721, a charge itemizing table 722, and a charged amount 723.

The usage statement table 721 has items of a used time 724, a used URL 725, a size 726, a priority 727, and a used bandwidth 728. The charge itemizing table 722 has a priority 729, a used volume 730, a used bandwidth 731, and a subtotal 732.

The usage statement table 721 records the number of services which have been provided to the user. The charge itemizing table 722 shows grounds for calculating a charge based on it.

Services which can be provided by the provider to the site and the user will be shown below with reference to the service contents of FIG. 23.

A first service is a Web service used by the user by dynamically selecting the quality and cost. In the service, the user can use, as a service set at low cost, a delivery service whose response time is not important having a small usable bandwidth. When the response time is important, the user may use the Web service at high cost by taking preference over other users.

Specifically, the provider can make an agreement in which the charge is added or discounted for each priority requested by the user, as in the bill 720 of FIG. 24. In the bill 720, the used time, the URL of the used Web service, the received Web object size, the priority requested by the user, and the bandwidth provided by the provider based on the request are described into the used time 724, the used URL 725, the size 726, the priority 727 and the used bandwidth 728 of the usage statement table 721. From the usage statement 722, a charged amount is calculated from the total of the received Web object sizes and the average of the provided bandwidth for each priority. They are described into the priority 729, the used volume 739, the used bandwidth 731, and the subtotal 732 to create the charge itemizing 722. The total of the subtotals 732 of the charged amount for each priority of the charge itemizing table 722 is printed as a final charged amount to the charged amount 723.

The service according to the communication priority, that is, communication quality can be provided by the provider. The user can receive a service along the desired service contents at a reasonable cost.

A second service is a service notifying the important traffic volume of the user in the agreed bandwidth to the site manager. In the service, the site manager can grasp the important traffic volume of the user to make a plan for increasing the number of network lines according to the user request.

A third service protects the existing Web service from the abruptly increased traffic volume. In the service, when newly introducing a Web application and the traffic volume of the Web application is increased abruptly, the Web application is identified by the URL and the Web object type to set a bandwidth used. The quality of the existing Web service can be protected. In addition, the Web application needing a specified bandwidth is protected from the traffic of the existing Web service to be introduced.

A fourth service is balance control for each of the types of the Web service. In the service, a stream delivery and a delivery service using the Web are identified by the specified URL and the Web object type. The site manager can control the balance of the used volume for each of the Web service types on the entire site. Stepwise introduction and excessive use limitation can be done.

A fifth service is a uniform Web service based on the used volume to the user in the site. The Web request has been processed equitably without depending on its used volume. When the quality of the Web service is a response time, the user who has made many requests can use a large number of the same service as that of other users to oppress the network line. The quality of the entire service is lowered.

The present invention holds the quality of the Web service from two aspects of the used volume and the Web response time. This allows the Web request of the user having a small used volume to take precedence over that of the user having a large used volume according to the used Web traffic volume. All the users can use a uniform quality Web service based on the used volume. The user is allowed to be conscious of the traffic volume. It is expected that use of the less-necessary Web having can be suppressed.

A sixth service is a service using an available bandwidth of an agreed bandwidth. There is a pre-reading technique to increase the Web response. However, the technique has a traffic volume larger than that of a typical Web service to oppress the network line, slowing the response of the Web service. The same network line is hard to use during the Web service. In the service, the pre-reading technique can be used by lowering the priority during the Web service without slowing the response of the Web service. Web information mirroring and a Web information search service have the same problem. The service can be expected to be adapted.

Embodiment 2

A second embodiment according to the present invention will be described below using FIGS. 25 and 26.

Figure 25:
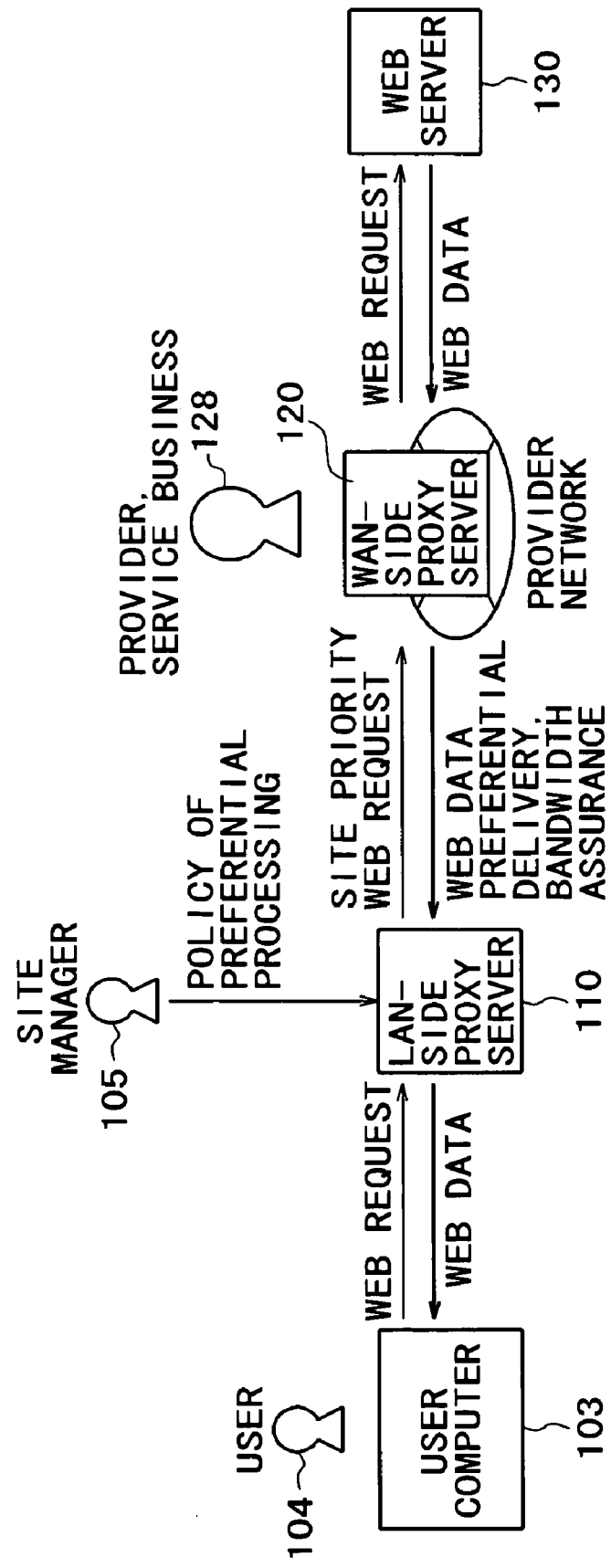
FIG. 25 is a diagram of assistance in explaining a system overview of a Web information preferential transfer system according to a second embodiment of the present invention.

FIG. 25 is a diagram of assistance in explaining a system overview of the Web information preferential transfer system according to the second embodiment of the present invention.

Figure 26:
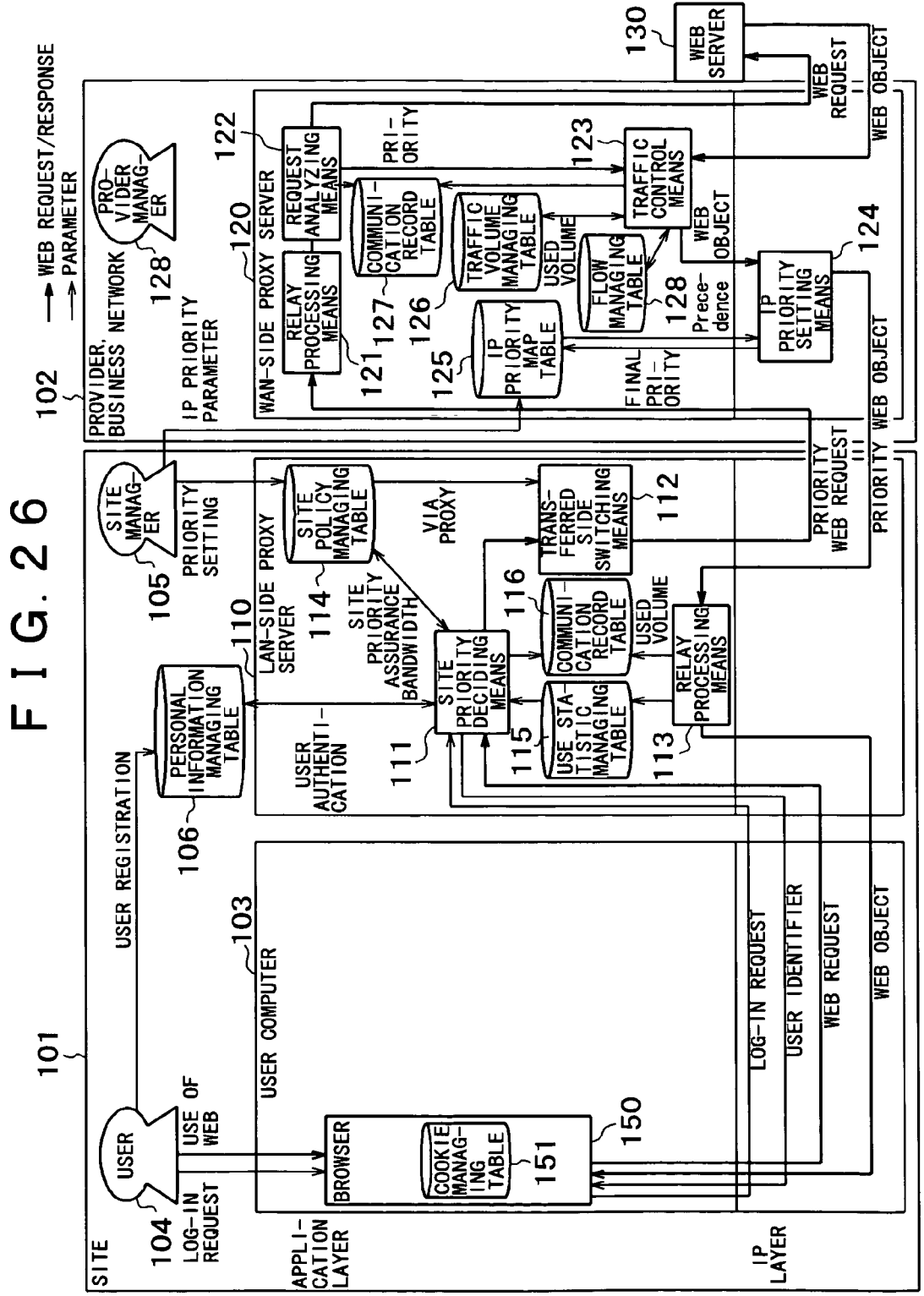
FIG. 26 is a system configuration diagram of the Web information preferential transfer system according to the second embodiment of the present invention.

FIG. 26 is a system configuration diagram of the Web information preferential transfer system according to the second embodiment of the present invention.

In the communication model of the Web information preferential transfer system of this embodiment, as shown in FIG. 25, the user 104 does not set the personal priority and the site manager 105 sets only the site priority. Other functions and operations of the functions are the same as the first embodiment.

In the configuration, as shown in FIG. 26, the software proxy is not relayed in the user computer 103 and the browser 150 directly accesses the LAN-side proxy server 110.

According to the configuration of the second embodiment, the user cannot specify the priority. The software proxy 140 need not be installed into the user computer 103. Only the LAN-side proxy server 110 can perform a service. Installation and management troubles can be reduced.

Embodiment 3

A third embodiment according to the present invention will be described below using FIGS. 27 and 28.

Figure 27:
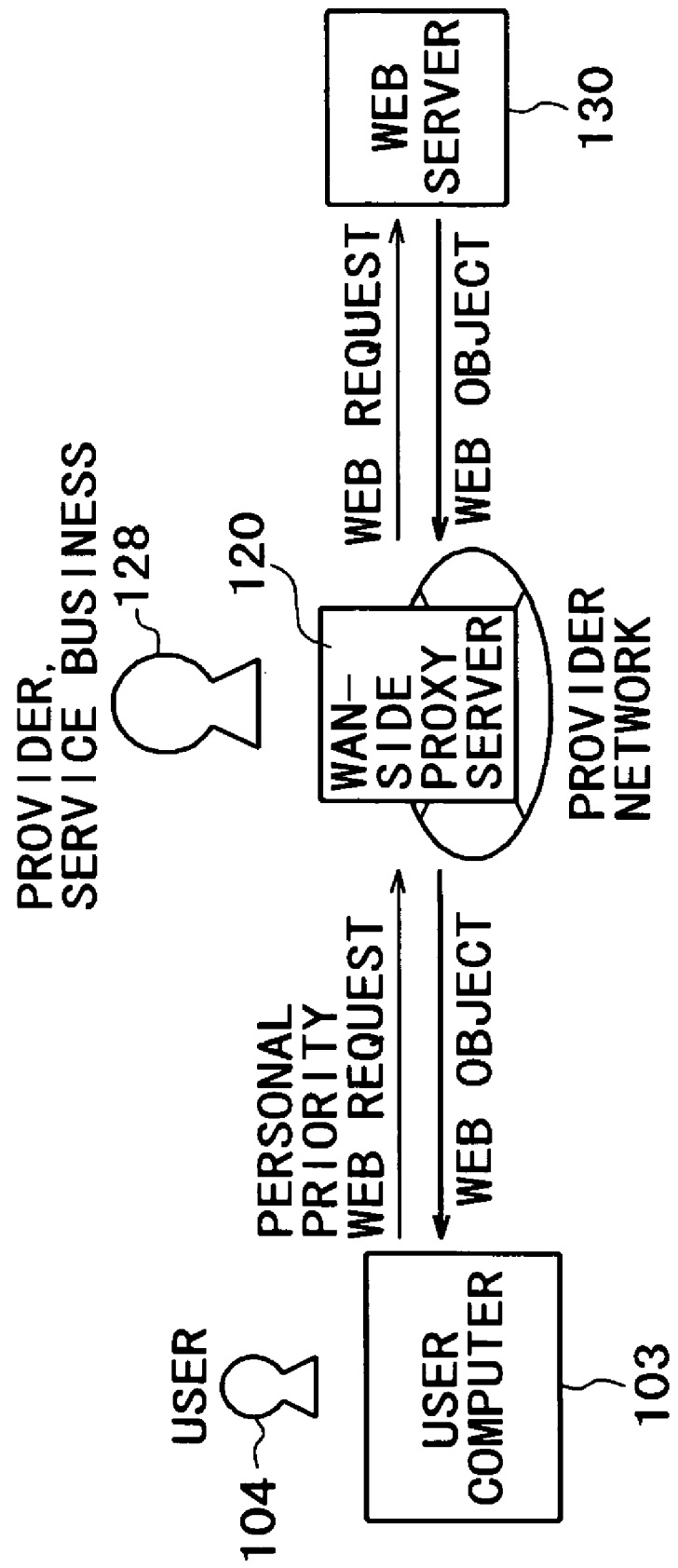
FIG. 27 is a diagram of assistance in explaining a system overview of a Web information preferential transfer system according to a third embodiment of the present invention.

FIG. 27 is a diagram of assistance in explaining a system overview of the Web information preferential transfer system according to the third embodiment of the present invention.

Figure 28:
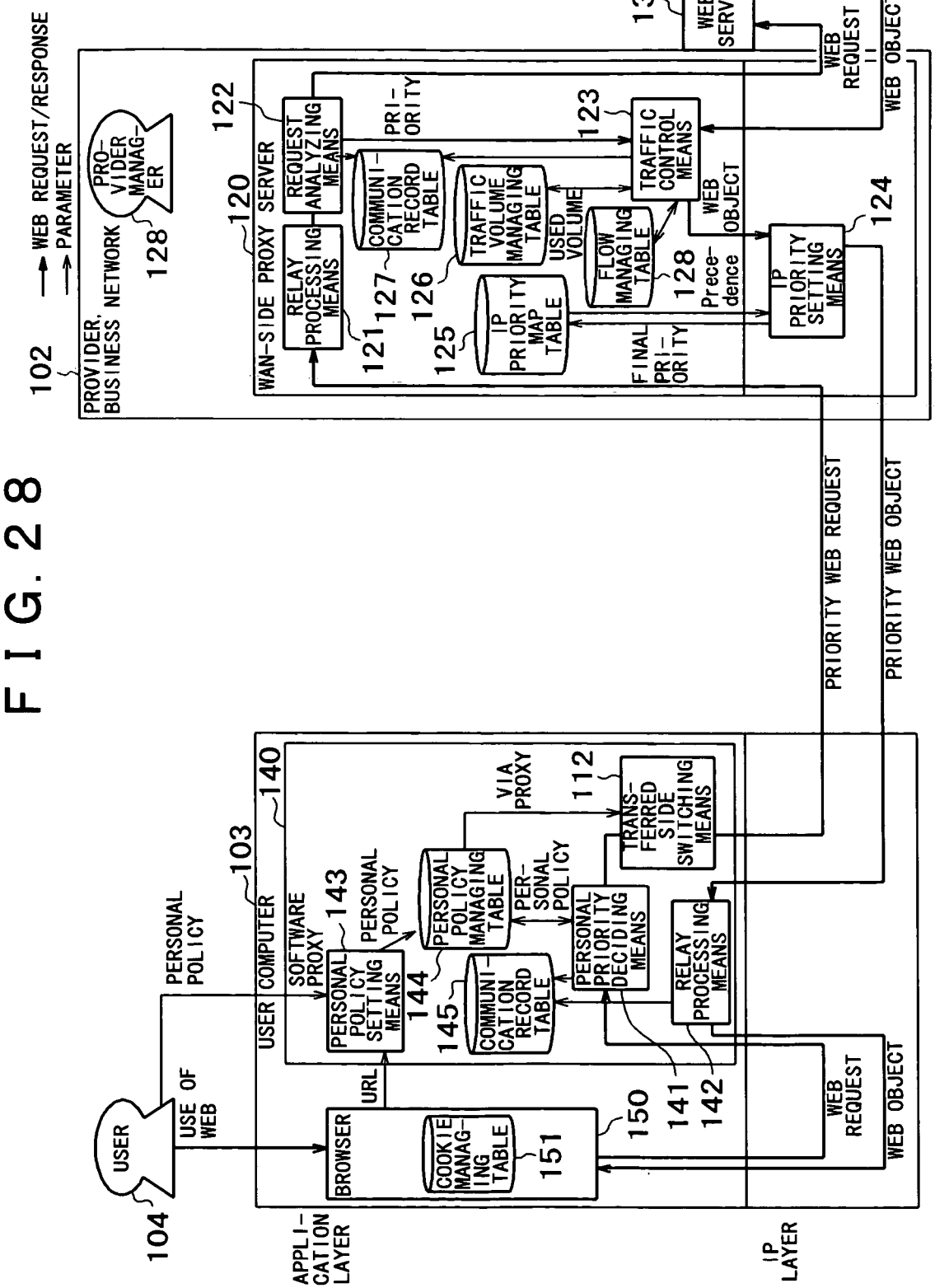
FIG. 28 is a system configuration diagram of the Web information preferential transfer system according to the third embodiment of the present invention.

FIG. 28 is a system configuration diagram of the Web information preferential transfer system according to the third embodiment of the present invention.

In the communication model of the Web information preferential transfer system of this embodiment, as shown in FIG. 27, the site priority is not set and the user 104 sets only the personal priority to send a Web request to the WAN-side proxy server 120. Other functions and operations of the functions are the same as the first embodiment.

In the configuration, as shown in FIG. 28, the LAN-side proxy server 110 which has set the site priority is unnecessary. The user computer 103 directly accesses the WAN-side proxy server 120 on the Internet network.

In the third embodiment, the provider 102 can directly provide preferential control and bandwidth assurance services based on the user priority to the user 104, not to the site 101. In this embodiment, the site concept does not exist. It is a communication model for persons and home using the Internet.

INDUSTRIAL APPLICABILITY

As described above, the Web information preferential transfer system of the present invention can provide a suitable communication system to receive a service according to used load when receiving Web information from the Web server via the provider on the existing Internet network.

The invention claimed is:

1. A web information transfer system stored on a computer readable medium for transferring a Web request from a user computer and a Web object from a Web server in response to the web request, comprising:
a LAN-side proxy server on the site of the user; and
a WAN-side proxy server on the site of said provider,
wherein said LAN-side proxy server identifies the Web request, sets a user-side priority based on the Web request and predetermined conditions, and transmits the Web request with the user-side priority to said WAN-side proxy server via a network including a router on the way, the user-side priority being a site-priority attached to the Web request in the LAN-side proxy server on the site of the user, wherein said WAN-side proxy server acquires the user-side priority attached to the Web request, converts the user-side priority into one of application-layer priorities for the Web object based on a communication state of the network and the predetermined conditions, relays said Web request without the user-side priority to the Web server to receive the Web object from the Web server converts said one of the application-layer priorities into control parameter of an IP packet composing the Web object, the control parameter instructing the router in the network to perform preferential control of the IP packet, adds said control parameter to the IP packet, and transmits the IP packet with the control parameter to said LAN-side proxy server via the router in the network, or said WAN-side proxy server, based on the application layer priorities performs preferential control of the IP packet of the Web object as its response, wherein said WAN-side proxy server manages a current traffic volume and an allocatable upper limit traffic volume for each of the application-layer priorities, and wherein, when the Web request requires a bandwidth assurance, said WAN-side proxy server refers to the traffic volumes of a highest one of the application-layer priorities, accepts the Web request in case that the bandwidth requested by the Web request which requires the bandwidth assurance can be allocated, and sets the highest one to the Web object corresponding to the Web request which requires the bandwidth assurance.

2. The Web information transfer system according to claim 1,
wherein the user computer has means setting a personal priority for the Web request,
wherein said LAN-side proxy server further has means totaling the communication records of the Web service for each user, and
the user-side priority set by said LAN-side proxy server is set based on said personal priority and said communication record of the Web service for the user, in addition to said predetermined conditions.

3. The Web information transfer system according to claim 1, wherein according to a traffic volume of the Web object received from said Web server or the communication state of said LAN-side proxy server and said WAN-side proxy server, and
conversion from said one of the application-layer priorities to the control parameter of the IP packet is done dynamically.

4. The Web information transfer system according to claim 1, wherein said WAN-side proxy server further has:
means totaling the communication records of the Web service for the user; and
means performing charging to the user based on the communication contents used by the user and the priority requested by the user.

* * * * *